(12) United States Patent
Greitmann et al.

(10) Patent No.: US 10,821,571 B2
(45) Date of Patent: Nov. 3, 2020

(54) HANDHELD, HAND-GUIDED CUTTING-OFF MACHINE

(71) Applicant: Hilti Aktiengesellschaft, Schaan (LI)

(72) Inventors: Ralf Greitmann, Kaufering (DE); Guenther Veik, Maeder (AT); Helmut Specht, Bad Woerishofen (DE)

(73) Assignee: Hilti Aktiengesellschaft, Schaan (LI)

( * ) Notice: Subject to any disclaimer, the term of this patent is extended or adjusted under 35 U.S.C. 154(b) by 406 days.

(21) Appl. No.: 15/778,902

(22) PCT Filed: Nov. 15, 2016

(86) PCT No.: PCT/EP2016/077667
§ 371 (c)(1),
(2) Date: May 24, 2018

(87) PCT Pub. No.: WO2017/089169
PCT Pub. Date: Jun. 1, 2017

(65) Prior Publication Data
US 2018/0345444 A1    Dec. 6, 2018

(30) Foreign Application Priority Data

Nov. 25, 2015   (EP) .................................... 15196162

(51) Int. Cl.
*B24B 27/08*   (2006.01)
*B24B 23/02*   (2006.01)
(Continued)

(52) U.S. Cl.
CPC .............. *B24B 27/08* (2013.01); *B23Q 11/06* (2013.01); *B24B 23/02* (2013.01); *B24B 55/052* (2013.01)

(58) Field of Classification Search
CPC ........ B24B 27/08; B24B 23/02; B24B 55/052
(Continued)

(56) References Cited

U.S. PATENT DOCUMENTS 5,116,162 A * 5/1992 Burhite .................. A01D 34/84
                                                      172/15
5,826,478 A * 10/1998 Zerrer .................... B23D 59/02
                                                      83/169
(Continued)

FOREIGN PATENT DOCUMENTS

DE    102004035876    12/2005
DE    102005049766     2/2010
(Continued)

*Primary Examiner* — George B Nguyen
(74) *Attorney, Agent, or Firm* — Davidson, Davidson & Kappel, LLC (57) ABSTRACT

A handheld, hand-guided cutting-off machine (10), which includes a rotating cutting-off wheel, a supporting housing part (36), an output shaft, which is rotatably supported around an output axis (40), a drive motor, a transmission mechanism (19), which connects the drive motor to the output shaft, a flange and a safety guard (24), which covers the cutting-off wheel over a covering area. The cutting-off wheel is rotatably fixedly mounted on the output shaft with the aid of the flange and surrounded by the safety guard (24), which is pivotable around a pivot axis. The safety guard (24), the supporting housing part (36) and the transmission mechanism (19) have maximum distances from the output axis (40) over an outcut angle ($\theta$), which are less than or equal to half the flange diameter of the flange.

9 Claims, 5 Drawing Sheets (51) Int. Cl.
*B24B 55/05* (2006.01)
*B23Q 11/06* (2006.01)

(58) Field of Classification Search
USPC .......................................................... 451/358
See application file for complete search history.

(56) References Cited

U.S. PATENT DOCUMENTS

| | | | |
|---|---|---|---|
| 6,375,557 B1 | 4/2002 | Spangenberg et al. | |
| 6,916,236 B2 * | 7/2005 | Terpstra | B23Q 11/0046 451/358 |
| 7,059,947 B2 * | 6/2006 | Crover | B23D 45/006 451/311 |
| 7,596,872 B2 * | 10/2009 | Clarke | B23D 45/16 30/388 |
| 7,819,724 B2 * | 10/2010 | Edmonds | B23Q 9/0085 451/342 |
| 9,221,111 B2 * | 12/2015 | Elfner | B24B 23/02 |
| 2003/0075028 A1 | 4/2003 | Hofmann et al. | |
| 2007/0107236 A1 | 5/2007 | Uhl | |
| 2012/0011731 A1 | 1/2012 | Yoshimura et al. | |
| 2014/0206265 A1 * | 7/2014 | Maute | B24B 41/04 451/358 |
| 2015/0004885 A1 * | 1/2015 | Scholz | B24B 23/028 451/358 |

FOREIGN PATENT DOCUMENTS

| | | | |
|---|---|---|---|
| EP | 1053829 | 11/2000 | |
| EP | 1609572 | 12/2005 | |
| GB | 2431603 A * | 5/2007 | ............ B28D 7/02 |
| JP | 2006110969 | 4/2006 | |
| JP | 5526442 | 6/2014 | |

* cited by examiner

HANDHELD, HAND-GUIDED CUTTING-OFF MACHINE

The present invention relates to a handheld, hand-guided cutting-off machine.

BACKGROUND

Cutting-off machines are handheld, hand-guided power tools, which include a machining tool designed in the form of a rotating cutting-off wheel. The key components of a cutting-off machine include, in addition to the cutting-off wheel, a supporting housing part, an output shaft, which is rotatably supported around an output axis, a drive motor, a transmission mechanism, which connects the drive motor to the output shaft, a flange and a safety guard, which covers the cutting-off wheel over a covering area. The cutting-off wheel is rotatably fixedly mounted on the output shaft with the aid of the flange and surrounded by the safety guard, which is pivotably supported around a pivot axis. The pivot axis of the safety guard is situated coaxially to the output axis, which corresponds to the rotation axis of the cutting-off wheel. DE 10 2005 049 766 B4 discloses a handheld, hand-guided cutting-off machine of this type.

The European standard EN ISO 19432:2012 and the U.S. standard ANSI B175.4-2013 define safety requirements and measures for testing the structural design of handheld, hand-guided cutting-off machines, which include a built-in combustion motor for one-man operation and are designated for cutting building materials, for example asphalt, concrete, stone and metal, and which apply to cutting-off machines which are provided for use with a rotating cutting-off wheel having cutting-off bodies made of bound abrasive material and/or grinding tools having diamond or CBN abrasive materials, which are mounted centrally on a spindle shaft and are driven thereby, the front face of the cutting-off wheel rotating in a direction facing away from the user. The standards define a minimum flange diameter for the flange, depending on the type and wheel diameter of a cutting-off wheel. With regard to the type of cutting-off wheels, a distinction is made between diamond cutting-off wheels and abrasive cutting-off wheels, and with regard to wheel diameter D of the cutting-off wheels, a distinction is made between four ranges (D≤250 mm, 250 mm<D≤300 mm, 300 mm<D≤350 mm and 350 mm<D). The European standard EN ISO 19432:2012 applies to cutting-off wheels having a maximum wheel diameter of 400 mm, and the US standard ANSI B175.4-2013 applies to cutting-off wheels having a maximum wheel diameter of 406 mm.

The European standard EN IEC 60745-2-22:2011 and the U.S. standard ANSI/UL 60745-2-22-2012 apply to hand-guided, motor-operated electric power tools in the form of cutting-off machines, which are provided with a rotating cutting-off wheel having wheel diameters from 55 mm to 410 mm for cutting off materials such as metal, concrete, masonry, glass and tile. The standards define a minimum flange diameter for the flange, depending on the type, wheel diameter D and bore diameter Ø of a cutting-off wheel. Regarding the type of cutting-off wheels, a distinction is made between diamond cutting-off wheels and bound, reinforced cutting-off wheels of type 41 or 42. Minimum flange diameter $d_{min}$ is $d_{min}=0.15*D$ for diamond cutting-off wheels having a wheel diameter D of 55 mm≤D≤410 mm. For bound, reinforced cutting-off wheels of type 41 or 42, a distinction is made between four ranges for wheel diameter D (55 mm≤D<80 mm, 80 mm≤D<105 mm, 105 mm≤D 230 mm and 230 mm<D≤410 mm), and a distinction is made between bore diameters Ø of 10 mm and 16 mm for wheel diameter D where 80 mm≤D<105 mm.

The maximum cutting depth achievable by a cutting-off wheel in a workpiece is defined by half the difference between the wheel diameter of the cutting-off wheel and the assigned minimum flange diameter of the flange. In practice, diamond cutting-off wheels having wheel diameters of 300 mm and 350 mm are primarily used in cutting-off machines which include a combustion motor. The maximum cutting depth achievable by a diamond cutting-off wheel having a wheel diameter of 300 mm is 127.5 mm, and the maximum cutting depth achievable by a diamond cutting-off wheel having a wheel diameter of 350 mm is 148.75 mm.

The actual cutting depths achievable by known cutting-off machines in a workpiece are less than the specified maximum cutting depths defined by half the difference between the wheel diameter and the minimum flange diameter. The equipment manufacturer Stihl offers different gas-powered cutting-off machines, the cutting-off machines TS 400, TS 410 and TS 420, among others. The TS 400 cutting-off machines are provided for diamond cutting-off wheels and may be operated with different wheel diameters of 300 mm and 350 mm. According to the manufacturer's information, the cutting depth achievable by the TS 400 cutting-off machine with a wheel diameter of 300 mm is 100 mm, and according to the manufacturer's information, the maximum cutting depth achievable by the TS 400 cutting-off machine with a wheel diameter of 350 mm is 125 mm. The TS 410 cutting-off machines are provided for diamond cutting-off wheels having a wheel diameter of 300 mm, and the TS 420 cutting-off machines are provided for diamond cutting-off wheels having a wheel diameter of 350 mm. According to the manufacturer's information, the maximum cutting depth achievable by the TS 410 cutting-off machine is 100 mm, and according to the manufacturer's information, the maximum cutting depth achievable by the TS 420 cutting-off machine is 125 mm.

The cutting depths achievable by the TS 400 cutting-off machine with a wheel diameter of 300 mm and the TS 410 cutting-off machine are 20% less than the maximum cutting depth of 127.5 mm, and the cutting depths achievable by the TS 400 cutting-off machine with a wheel diameter of 350 mm and the TS 420 cutting-off machine are approximately 16% less than the maximum cutting depth of 148.75 mm. The flanges which Stihl uses in the TS 400, TS 410 and TS 420 cutting-off machines have a flange diameter of at least 103 mm. In the TS 400 cutting-off machines, which may be operated with different wheel diameters of 300 mm and 350 mm, the same flange diameter of at least 103 mm is provided for the different wheel diameters. The flange diameters used are much larger than minimum flange diameter $d_{min}$, which the European standard EN ISO 19432:2012 and the U.S. standard ANSI B175.4-2013 require for diamond cutting-off wheels having a wheel diameter of 300 mm ($d_{min}≥45$ mm) and a wheel diameter of 350 mm ($d_{min}≥52.5$ mm). The standards apply to cutting-off machines which were manufactured on or after the publication date of the standards and not to cutting-off machines which were manufactured before the publication date of the standards. The previous versions of the standards have also defined the same minimum flange diameters of 45 mm and 52.5 mm for diamond cutting-off wheels having wheel diameters of 300 mm and 350 mm.

SUMMARY OF THE INVENTION

It is an object of the present invention to further develop a handheld, hand-guided cutting-off machine in such a way that the cutting depth achievable with a cutting-off wheel in a workpiece is increased compared to the known cutting-off machines, and preferably the maximum cutting depth is achieved, which is defined by half the difference between the wheel diameter of the cutting-off wheel and the minimum flange diameter of the flange.

According to the present invention, the handheld, hand-guided cutting-off machine is characterized in that the flange diameter of the flange corresponds to a minimum flange diameter, and the safety guard has maximum distances from the output axis over a first angle range, the supporting housing part has maximum distances from the output axis over a second angle range, and the transmission mechanism has maximum distances from the output axis over a third angle range, which are less than or equal to half the minimum flange diameter. The flange diameters which are specified as the lower limiting values for the flange in the particular, applicable standards are defined as minimum flange diameters. Among other things, the minimum flange diameter is dependent on the type of drive motor, the type of cutting-off wheel and the wheel diameter of the cutting-off wheel.

In the cutting-off machine according to the present invention, the safety guard has a first outer contour having a first maximum distance from the output axis, and the angle range, in which the first outer contour of the safety guard has distances from the output axis which are less than or equal to half the minimum flange diameter, is defined as the first angle range. The supporting housing part has a second outer contour having a second maximum distance, and the angle range, in which the second outer contour of the supporting housing part has distances from the output axis which are less than or equal to half the minimum flange diameter, is defined as the second angle range. The transmission mechanism has a third outer contour having a third maximum distance from the output axis, and the angle range, in which the third outer contour of the transmission mechanism has distances from the output axis which are less than or equal to half the minimum flange diameter, is defined as the third angle range. The design of the first, second and third outer contours makes it possible to achieve the maximum cutting depth defined as half the difference between the wheel diameter of the cutting-off wheel and the minimum flange diameter with the aid of the cutting-off machine according to the present invention. Among other things, the maximum cutting depth is dependent on the type of drive motor, the type of cutting-off wheel and the wheel diameter of the cutting-off wheel. The maximum cutting depth is achieved at an operating angle of the cutting-off machine, in which the first, second and third outer contours have maximum distances from the output axis, which are less than or equal to half the minimum flange diameter. The maximum cutting depth is achievable only if the intersection between the first, second and third angle ranges is different than zero.

In one specific embodiment, the safety guard is adjustable between a front and a rear pivot position, an outcut angle, which is formed as the intersection between the first, second and third angle ranges, is different than zero for at least one pivot position of the safety guard. The safety guard is pivotable around the pivot axis and adjustable between a front pivot position and a rear pivot position, it being possible to situate the safety guard in discrete pivot positions or in any arbitrary pivot position between the front and rear pivot positions. The first outer contour of the safety guard is designed to be adjustable around the pivot axis; the second outer contour of the supporting housing part and the third outer contour of the transmission mechanism are designed to be not adjustable. When the safety guard is moved around the pivot axis, the position of the first angle range changes relative to the second and third angle ranges. In the outcut angle, the three components of the cutting-off machine according to the present invention which are designed as the safety guard, supporting housing part and transmission mechanism have distances from the output axis which are less than or equal to half the minimum flange diameter. When the operating angle of the cutting-off machine according to the present invention is within the outcut angle, the maximum cutting depth is achievable, which is defined as half the difference between the wheel diameter of the cutting-off wheel and the minimum flange diameter.

The outcut angle is particularly preferably different than zero for all pivot positions of the safety guard between the front and the rear pivot positions. In the outcut angle, the three components which are designed as the safety guard, supporting housing part and transmission mechanism have distances from the output axis which are less than or equal to half the minimum flange diameter. In the cutting-off machine according to the present invention, if the outcut angle is different than zero for all pivot positions of the safety guard, the maximum cutting depth is achievable in each pivot position of the safety guard. The cutting-off machine must be oriented by the operator in such a way that the operating angle is within the outcut angle.

The pivot axis of the safety guard is particularly preferably displaced with respect to the output axis of the output shaft by a distance 4 into the covering area of the safety guard. The safety guard is includes the covering area, which covers the cutting-off wheel, and the machining area, which exposes the cutting-off wheel for machining a workpiece. To achieve a preferably great cutting depth with the aid of a cutting-off wheel, a flange having a preferably small flange diameter is used. In the cutting-off machine according to the present invention, a flange having the minimum flange diameter is used; the minimum flange diameter corresponds to the smallest flange diameter possible according to the standards. The smaller the flange diameter is selected, the smaller is the receiving area for the arrangement and support of the components (bearing for the output shaft, safety guard, supporting housing part and transmission mechanism), the support of the safety guard being particularly critical. The safety guard includes a fastening flange, which is mounted on a matching counter-contour of the supporting housing part and is adjustable around the pivot axis with respect to the counter-contour. If the pivot axis of the safety guard coincides with the output axis of the output shaft, the diameter of the fastening flange is limited by the minimum flange diameter. The diameter of the fastening flange is a variable which is essentially defined by the size and weight of the safety guard in pivotable safety guards which are adjustable via frictional engagement. Due to the displacement of the pivot axis into the covering area of the safety guard, the diameter of the fastening flange may be selected to be larger than the flange diameter of the flange used. The displacement of the pivot axis with respect to the output axis is particularly advantageous if the diameter of the fastening flange is to be optimally adapted to the size and weight of the safety guard.

The size of the first angle range is particularly preferably dependent on the pivot position of the safety guard. The safety guard is adjustable around the pivot axis, and the position of the first angle range changes during the pivoting relative to the second angle range of the supporting housing part and the third angle range of the transmission mechanism. If the pivot axis is displaced with respect to the output axis, the size of the first angle range may change during the pivoting.

In one preferred embodiment of the cutting-off machine according to the present invention, the transmission mechanism includes an output disk, which is situated on the output shaft, and a transmission element, which transmits a movement of the drive motor to the output disk, the output disk and the transmission element having maximum distances from the output axis over the third angle range, which are less than or equal to half the minimum flange diameter. The transmission mechanism is one of the components of the cutting-off machine which are situated in the receiving area. The condition that the maximum distance of the transmission mechanism from the output axis is less than or equal to half the minimum flange diameter in the third angle range must be met for all subcomponents of the transmission mechanism. These include the output disk, which is situated on the output shaft, and the transmission element, which is situated on the output disk. The output disk has a fourth maximum distance from the output axis, and the transmission element has a fifth maximum distance from the output axis.

The transmission mechanism particularly preferably includes a cover, which covers the output disk and the transmission element, the cover having a maximum distance from the output axis over the third angle range, which is less than or equal to half the minimum flange diameter. The subcomponents of the transmission mechanism which are designed as the output disk and the transmission element are rotating components, which must be covered to meet safety requirements. The cover has a sixth maximum distance from the output axis.

In a first variant of the cutting-off machine according to the present invention, the drive motor is designed as a combustion motor, and the cutting-off wheel is designed as a diamond cutting-off wheel or as an abrasive cutting-off wheel. The European standard EN ISO 19432:2012 applies to gas-powered cutting-off machines in Europe, and the U.S. standard ANSI B175.4-2013 applies thereto in the United States. Comparable standards are valid in other countries or regions outside Europe and the United States, and the European standard may be implemented in national standards in European countries. In cutting-off machines according to the present invention which include a combustion motor and a diamond cutting-off wheel, minimum flange diameter $d_{min}$ is: $d_{min}=37.5$ mm for D≤250 mm, $d_{min}=45$ mm for 250 mm<D≤300 mm, $d_{min}=52.5$ mm for 300 mm<D≤350 mm and $d_{min}=60$ mm for 350 mm<D. In cutting-off machines which include a combustion motor and an abrasive cutting-off wheel, minimum flange diameter $d_{min}$ is: $d_{min}=63.5$ mm for D≤250 mm, $d_{min}=75$ mm for 250 mm<D≤300 mm, $d_{min}=87.5$ mm for 250 mm<D≤350 mm and $d_{min}=100$ mm for 350 mm<D.

A cutting-off machine according to the present invention which includes a combustion motor and a diamond cutting-off wheel achieves a maximum cutting depth of 106.25 mm (½*(250 mm−37.5 mm)) with a wheel diameter of 250 mm, a maximum cutting depth of 127.5 mm (½*(300 mm−45 mm)) with a wheel diameter of 300 mm, a maximum cutting depth of 148.75 mm (½*(350 mm−52.5 mm)) with a wheel diameter of 350 mm and a maximum cutting depth of 170 mm (½*(400 mm−60 mm)) with a wheel diameter of 400 mm. A cutting-off machine according to the present invention which includes a combustion motor and an abrasive cutting-off wheel, achieves a maximum cutting depth of 93.25 mm (½*(250 mm−63.5 mm)) with a wheel diameter of 250 mm, a maximum cutting depth of 112.5 mm (½*(300 mm−75 mm)) with a wheel diameter of 300 mm, a maximum cutting depth of 131.25 mm (½*(350 mm−87.5 mm)) with a wheel diameter of 350 mm and a maximum cutting depth of 150 mm (½*(400 mm−100 mm)) with a wheel diameter of 400 mm.

In a second variant of the cutting-off machine according to the present invention, the drive motor is designed as an electric motor, and the cutting-off wheel is designed as a diamond cutting-off wheel or as a bound, reinforced cutting-off wheel of type 41 or 42. The European standard EN IEC 60745-2-22:2011 applies to cutting-off machines which include an electric motor in Europe, and the U.S. standard ANSI/UL 60745-2-22-2012 applies thereto in the United States. Comparable standards are valid in other countries or regions outside Europe and the United States, and the European standard may be implemented in national standards in European countries. For cutting-off machines according to the present invention which include an electric motor and a diamond cutting-off wheel, minimum flange diameter $d_{min}$ is: $d_{min}=0.15*D$ for 55 mm≤D≤410 mm. For cutting-off machines according to the present invention which include an electric motor and a bound, reinforced cutting-off wheel of type 41 or 42, minimum flange diameter $d_{min}$ is: $d_{min}=19$ mm for 55 mm≤D<80 mm, $d_{min}=19$ mm where Ø=10 mm and $d_{min}=28$ mm where Ø=16 mm for 80 mm≤D<105 mm, $d_{min}=40$ mm for 105 mm≤D≤230 mm and $d_{min}=0.25*D$ for 230 mm<D≤410 mm.

BRIEF DESCRIPTION OF THE DRAWINGS

Exemplary embodiments of the present invention are described below on the basis of the drawing. The latter is not necessarily intended to represent the exemplary embodiments true to scale but rather the drawing is presented in a schematic and/or slightly distorted form where useful for the purpose of explanation. It should be taken into account that a variety of modifications and changes relating to the form and detail of a specific embodiment may be undertaken without deviating from the general idea of the present invention. The general idea of the present invention is not limited to the exact form or the detail of the preferred specific embodiment illustrated and described below, nor is it limited to an object which would be limited in comparison to the object claimed in the claims. In given measurement ranges, values within the specified limits are also to be disclosed as limiting values and be able to be arbitrarily used and claimed. For the sake of simplicity, the same reference numerals are used below for identical or similar parts or for parts having identical or similar functions.

DETAILED DESCRIPTION

Figure 1A:
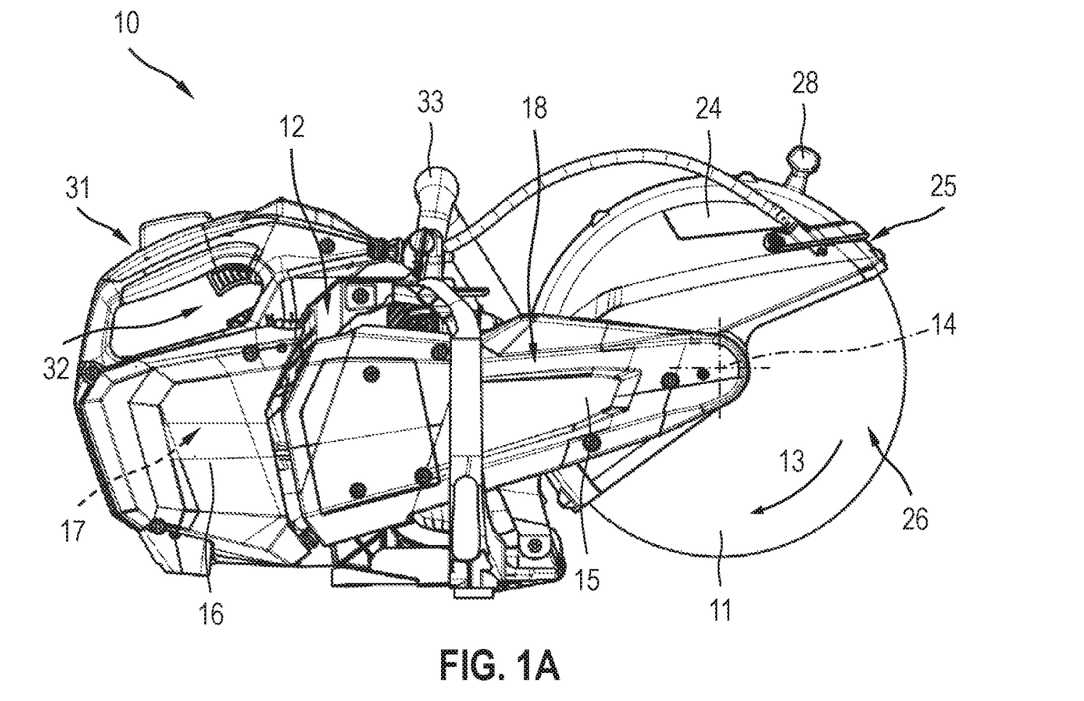
FIGS. 1A, 1B show a handheld, hand-guided cutting-off machine according to the present invention, including a cutting-off wheel.
Figure 1B:
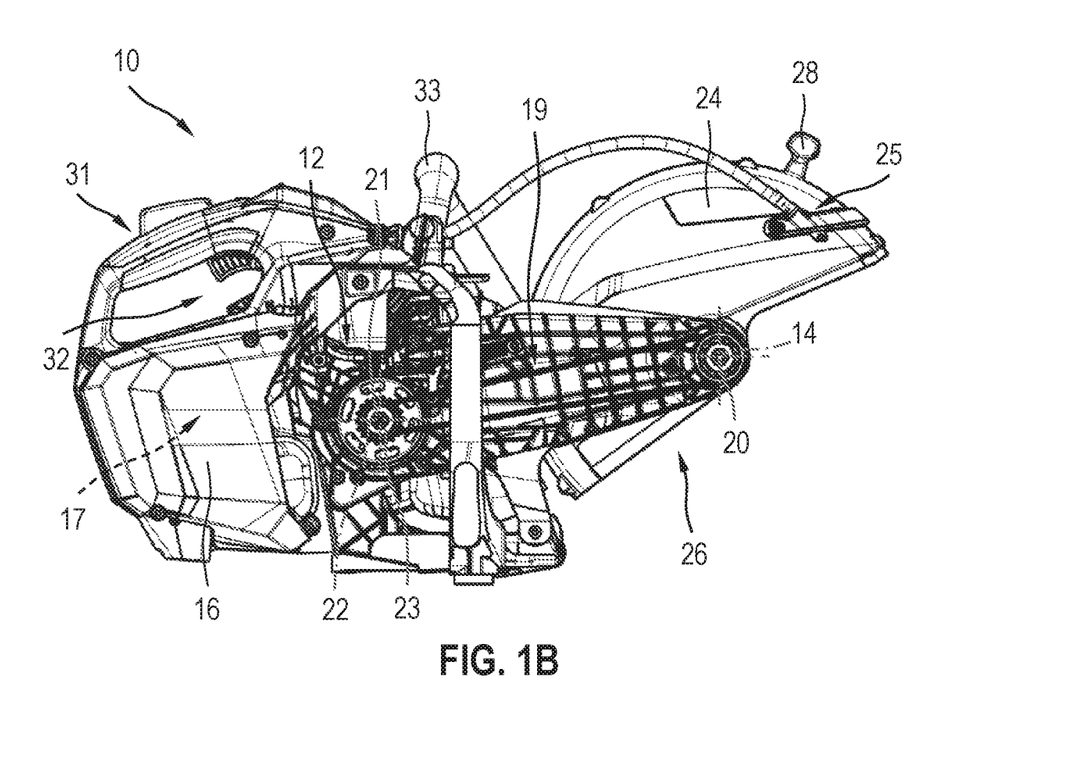

FIGS. 1A, 1B show a handheld, hand-guided power tool 10 according to the present invention, which is designed in the form of a cutting-off machine. Cutting-off machine 10 includes a machining tool designed as a cutting-off wheel 11, which is driven by a drive unit 12 in a rotation direction 13 around a rotation axis 14. All drive components for cutting-off wheel 11 are combined as drive unit 12. In cutting-off machine 10 illustrated in FIG. 1B, a cover 15 was removed, so that at least some drive components of drive unit 12 are visible. Cover 15 may have a single-part or multi-part design and is fastened to cutting-off machine 10 by screws.

Drive unit 12 includes a drive motor 17 situated in a motor housing 16, a transmission mechanism situated in a supporting arm 18 and designed as a belt drive 19, and an output shaft 20, on which cutting-off wheel 11 is mounted. Additional transmission components are connectable as needed between drive motor 17 and belt drive 19. A centrifugal clutch may be situated between drive motor 17 and belt drive 19, which ensures that cutting-off wheel 11 does not rotate at low rotational speeds, such as when idling or when starting cutting-off machine 10. The centrifugal clutch includes a clutch bell, against which the centrifugal weights are pressed outwardly during operation, due to the centrifugal force. Drive motor 17 drives a drive shaft 21 around a drive axis 22. The clutch bell of the centrifugal clutch is rotatably fixedly connected to a drive disk 23, which is rotatably supported on drive shaft 21.

Combustion motors or electric motors are used as drive motors 17 for cutting-off machine 10. All drive motors for motor-operated electric power tools are combined under the term "electric motor"; the electric power tools may be cable-bound with a direct connection to the grid or wireless without a direct connection to the grid. Cutting-off machines which include a combustion motor may be used with different types of cutting-off wheels 11—diamond cutting-off wheels and abrasive cutting-off wheels—the cutting-off wheels including cutting-off bodies made of bound abrasive materials and/or grinding tools having diamond and CBN abrasive materials. Cutting-off machines which include an electric motor may be used with different types of cutting-off wheels 11: diamond cutting-off wheels and bound, reinforced cutting-off wheels of type 41 or 42.

Cutting-off wheel 11 is surrounded by a safety guard 24, which is used to protect the operator against flying dust particles and also reduces the risk of injury by the operator reaching into rotating cutting-off wheel 11 during the operation of cutting-off machine 10. Safety guard 24 is fastened in a hub area of cutting-off wheel 11 and is made up of a covering area 25, which covers cutting-off wheel 11 over a covering angle of approximately 200°, and a machining area 26, which exposes cutting-off wheel 11 over a machining angle of 160° for machining a workpiece. Safety guard 24 is designed to be pivotable and may be pivoted around a pivot axis 27 (FIGS. 2A, 2B) into a desired pivot position. To set the pivot position, a hand grip element 28 is fastened to safety guard 24, which may be used to apply the necessary forces to pivot safety guard 24 around pivot axis 27.

A first handle 31, which has an operating unit 32 and is designed as a top handle, is provided for operating cutting-off machine 10. A handle which is situated above motor housing 16 is referred to as a top handle. Alternatively, the first handle may be designed as a rear handle, which is situated on the side of motor housing 16 facing away from cutting-off wheel 11. In addition to first handle 31, a second handle 33, which is situated between cutting-off wheel 11 and first handle 31, is provided for guiding cutting-off machine 10. In the exemplary embodiment shown in FIGS. 1A, 1B, second handle 33 is designed as a separate gripping tube, or it may be alternatively designed as a single piece with motor housing 16 or another housing part.

Figure 2A:
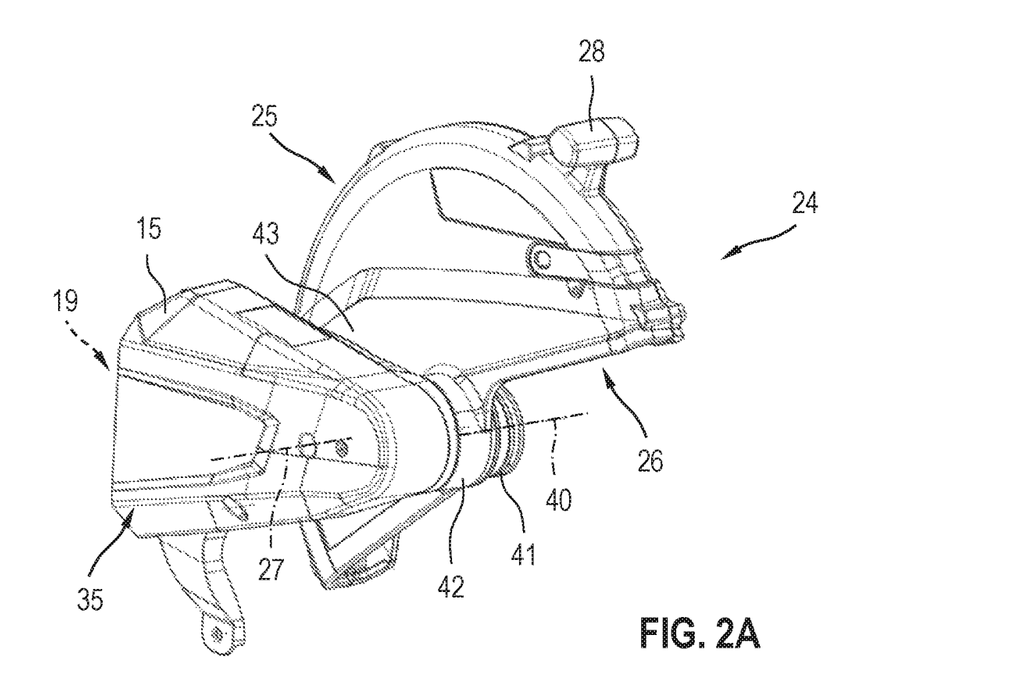
FIGS. 2A, 2B show a safety guard and a belt drive of the cutting-off machine illustrated in FIGS. 1A, 1B, including a cover (FIG. 2A) and without a cover (FIG. 2B)
Figure 2B:
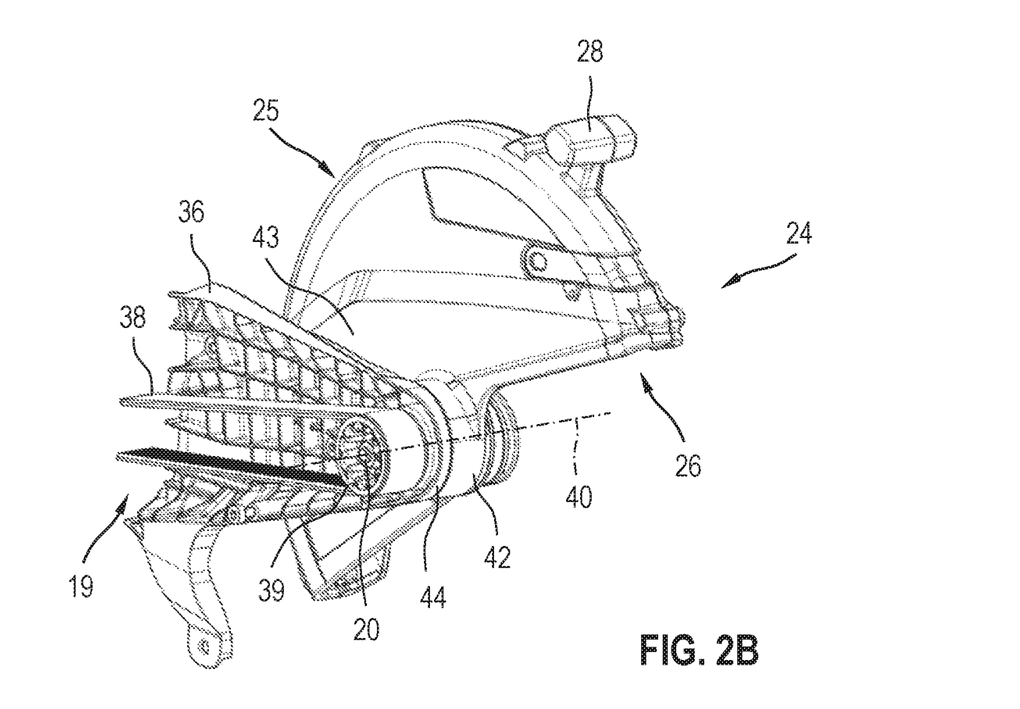

FIGS. 2A, 2B show an enlarged representation of safety guard 24 and belt drive 19 of cutting-off machine 10 from FIGS. 1A, 1B. Belt drive 19 is situated in a supporting arm housing 35, which includes a stationary, supporting housing part 36 and cover 15. FIG. 2A shows belt drive 19, including mounted cover 15, and FIG. 2B shows belt drive 19 without cover 15.

The drive of cutting-off wheel 11 takes place via drive motor 17, belt drive 19 and output shaft 20. Drive motor 17 may be designed as a combustion motor or as an electric motor. Drive motor 17 drives drive shaft 21 and drive disk 23 around drive axis 22. A transmission element 38 designed as a drive belt is guided via drive disk 23 and an output disk 39 supported on output shaft 20. Output shaft 20 is rotatable around an output axis 40, which coincides with rotation axis 14 of cutting-off wheel 11. Drive disk 23, drive belt 38 and output disk 39 form belt drive 19. Alternatively, transmission mechanism 19 may be designed, for example, in the form of a chain drive, in which the transmission element between drive disk 23 and output disk 39 is designed as a chain. Cutting-off wheel 11 is situated on output shaft 20 with the aid of a flange 41 and is rotatably fixedly connected to output shaft 20. Flange 41 and cutting-off wheel 11 are mounted on output shaft 20, and cutting-off wheel 11 is situated between two flange halves of flange 41.

A workpiece is machined with the aid of cutting-off machine 10 in the area of cutting-off wheel 11 situated in machining area 26 of safety guard 24. Safety guard 24 includes a fastening flange 42 in the hub area of cutting-off wheel 11, which, in the exemplary embodiment, is designed as a single piece with a side wall 43 of safety guard 24; alternatively, the fastening flange may also be designed as a separate part and connected to safety guard 24. Fastening flange 42 is mounted on a matching counter-contour 44 of the stationary housing part 36 and is designed to be adjustable with respect to counter-contour 44 of housing part 36.

For gas-powered cutting-off machines, the European standard EN ISO 19432:2012, the U.S. standard ANSI B175.4-2013 and corresponding standards in other countries define a minimum flange diameter $d_{min}$ for flange 41, depending on the type of cutting-off wheel 11 (diamond cutting-off wheel or abrasive cutting-off wheel) and on wheel diameter D of cutting-off wheel 11 (D≤250 mm, 250 mm<D≤300 mm, 300 mm<D≤350 mm and 350 mm<D). For diamond cutting-off wheels, minimum flange diameter $d_{min}$ is: $d_{min}$37.5 mm for D≤250 mm, $d_{min}$=45 mm for 250 mm<D≤300 mm, $d_{min}$=52.5 mm for 300 mm<D≤350 mm and $d_{min}$=60 mm for 350 mm<D. For abrasive cutting-off wheels, minimum flange diameter $d_{min}$ is: $d_{min}$63.5 mm for D≤250 mm, $d_{min}$=75 mm for 250 mm<D≤300 mm, $d_{min}$=87.5 mm for 300 mm<D≤350 mm and $d_{min}$=100 mm for 350 mm<D.

Maximum cutting depth $t_{max}$ achievable by cutting-off wheel 11 in a workpiece is then achieved if flange diameter $d_f$ of flange 41 corresponds to minimum flange diameter $d_{min}$ and no components of cutting-off machine 10 additionally limit the cutting depth. Maximum cutting depth $t_{max}$ is defined by half the difference between wheel diameter D of cutting-off wheel 11 and minimum flange diameter $d_{min}$, of flange 41: $t_{max}=\frac{1}{2}*(D-d_{mim})$. In gas-powered cutting-off machines 10 and a diamond cutting-off wheel, maximum cutting depth $t_{max}$ is: $t_{max}$=106.25 mm for D=250 mm, $t_{max}$=127.5 mm for D=300 mm, $t_{max}$=148.75 mm for D=350 mm and $t_{max}$=170 mm for D=400 mm. In gas-powered cutting-off machines and an abrasive cutting-off wheel, maximum cutting depth $t_{max}$ is: $t_{max}$=93.25 mm for D=250 mm, $t_{max}$=112.5 mm for D=300 mm, $t_{max}$=131.25 mm for D=350 mm and $t_{max}$=150 mm for D=400 mm.

Figure 3A:
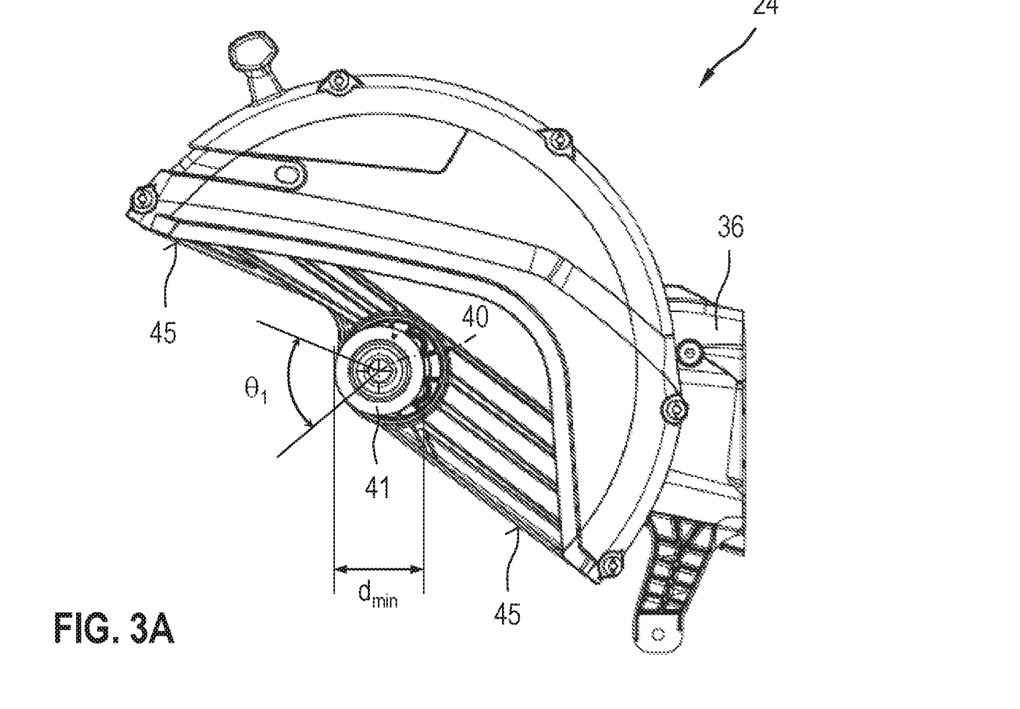
FIGS. 3A, 3B show the safety guard of the cutting-off machine in a front pivot position (FIG. 3A) and a rear pivot position (FIG. 3B)
Figure 3B:
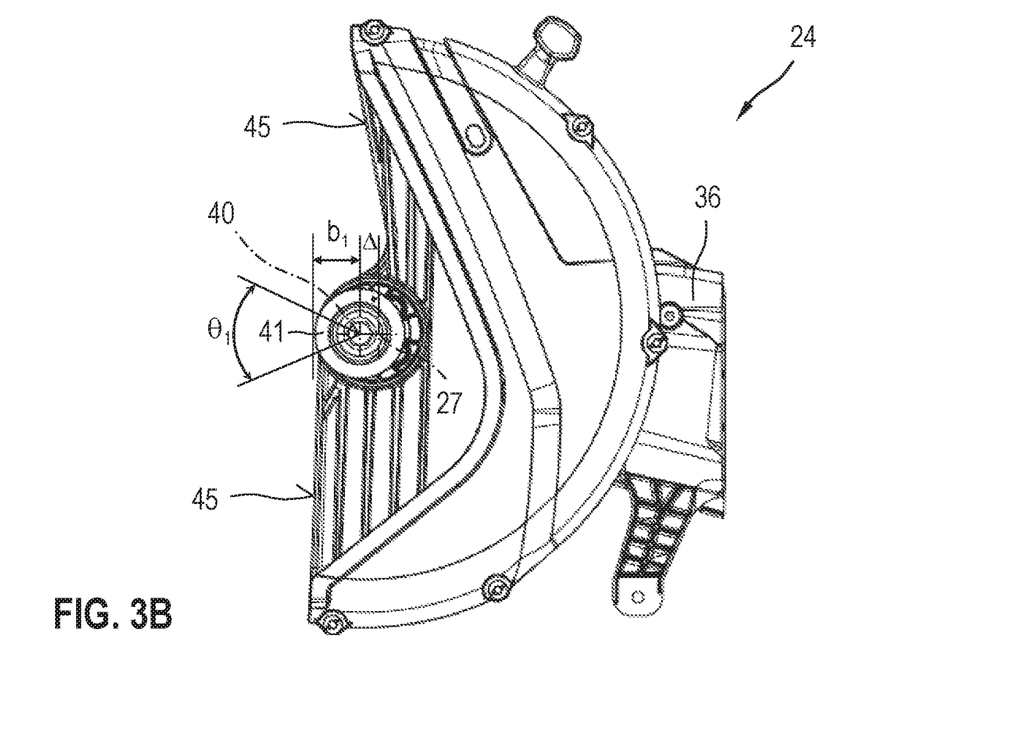

FIGS. 3A, 3B show flange 41 and safety guard 24 in a front pivot position (FIG. 3A) and a rear pivot position (FIG. 3B). Safety guard 24 is designed to be pivotable around pivot axis 27 between the front pivot position and the rear pivot position; in the exemplary embodiment, the pivot range of safety guard 24 is limited to an angle range of approximately 60°. As in the exemplary embodiment, safety guard 24 may be situated in any arbitrary pivot position between the front and rear pivot positions; alternatively, discrete pivot positions may be provided for safety guard 24 between the front and rear pivot positions.

Pivot axis 27 of safety guard 24 is different than output axis 40 of output shaft 20. Pivot axis 27 is displaced by a distance 4 with respect to output axis 40 into covering area 25 of safety guard 24. The full angle of cutting-off wheel 11 of 360° is divided by safety guard 24 into a covering angle and a machining angle. Covering area 25 of safety guard 24 determines the covering angle, and machining area 26 of safety guard 24 determines the machining angle. In the exemplary embodiment, the covering angle is approximately 200°, and the machining angle is approximately 160°.

Safety guard 24 has a first outer contour 45. The angle range, in which first outer contour 45 of safety guard 24 has distances from output axis 40 which are less than or equal to half of minimum flange diameter $d_{min}$, is defined as first angle range $\theta_1$. The maximum distance which first outer contour 45 has in first angle range $\theta_1$ is defined as first maximum distance $b_1$. First maximum distance $b_1$ corresponds to half of minimum flange diameter $d_{min}$. The position and size of first angle range $\theta_1$ change during the pivoting of safety guard 24 around pivot axis 27. FIG. 3A shows first angle range $\theta_1$ in the front pivot position of safety guard 24, and FIG. 3B shows first angle range $\theta_1$ in the rear pivot position of safety guard 24.

Figure 4A:
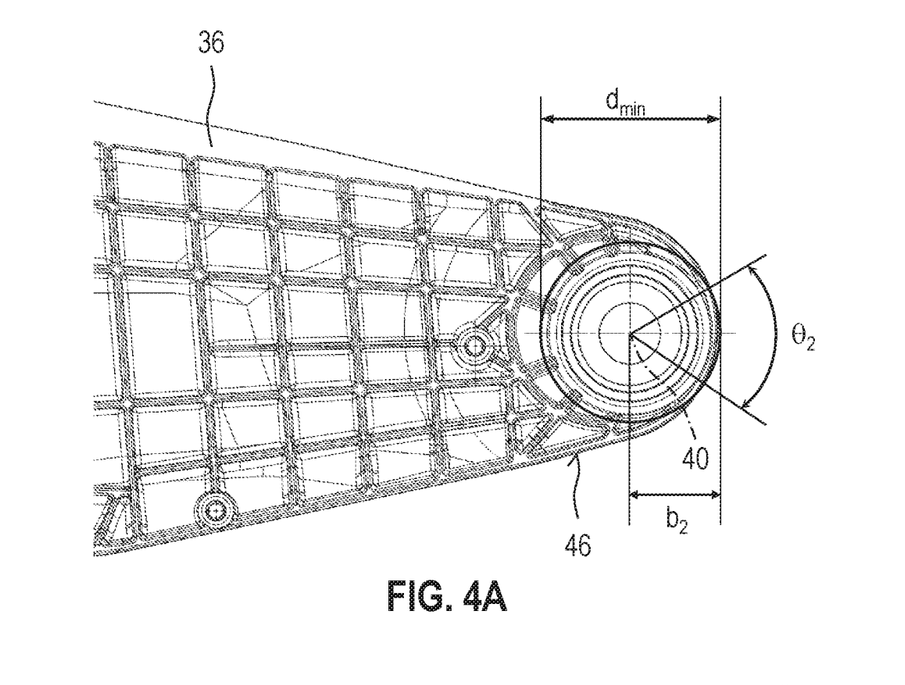
FIGS. 4A, 4B show the supporting housing part (FIG. 4A) and the transmission mechanism (FIG. 4B) of the cutting-off machine.
Figure 4B:
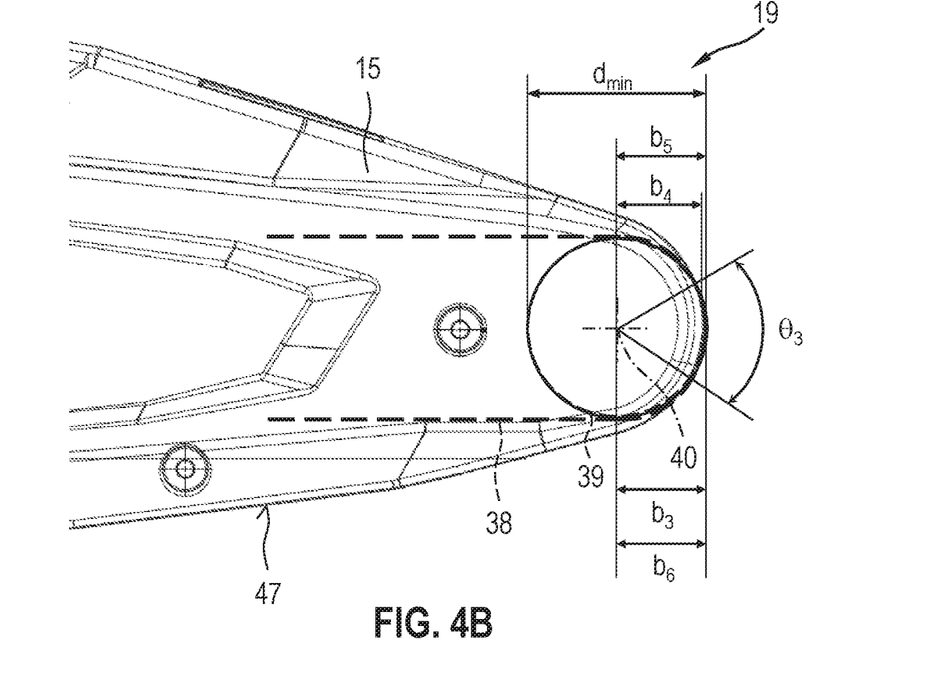

FIGS. 4A, 4B show supporting housing part 36 (FIG. 4A) and transmission mechanism 19 (FIG. 4B) in the area of output shaft 20. To be able to achieve maximum cutting depth $t_{max}$ with the aid of cutting-off wheel 11, not only safety guard 24 but also supporting housing part 36 and transmission mechanism 19 must be designed in such a way that their outer contours do not project over flange 41.

Supporting housing part 36 has a second outer contour 46. The angle range, in which second outer contour 46 of supporting housing part 36 has distances from output axis 40 which are less than or equal to half of minimum flange diameter $d_{min}$, is defined as second angle range $\theta_2$. The maximum distance which second outer contour 46 has in second angle range $\theta_2$ is defined as second maximum distance $b_2$. Second maximum distance $b_2$ corresponds to half of minimum flange diameter $d_{min}$.

Transmission mechanism 19 includes output disk 39, which is situated on output shaft 20, transmission element 38, which transmits a movement of drive motor 17 to output disk 39, and cover 15, which covers output disk 39 and transmission element 38. Output disk 39 and transmission element 38 are rotating components, which must be covered with the aid of cover 15 to meet safety requirements. The outer contour of transmission mechanism 19 is therefore determined by cover 15. Transmission mechanism 19 has a third outer contour 47. The angle range, in which third outer contour 47 of transmission mechanism 19 has distances from output axis 40 which are less than or equal to half of minimum flange diameter $d_{min}$, is defined as third angle range $\theta_3$. The maximum distance which third outer contour 47 has in third angle range $\theta_3$ is defined as third maximum distance $b_3$. Third maximum distance $b_3$ corresponds to half of minimum flange diameter $d_{min}$.

If transmission mechanism 19 does not include any rotating components, cover 15 may be eliminated or be provided with a different design. The condition that the maximum distance of transmission mechanism 19 from output axis 40 is less than or equal to half the minimum flange diameter in third angle range $\theta_3$ must generally be met for each subcomponent of transmission mechanism 19. These include output disk 39, which is situated on output shaft 20, and transmission element 38, which is situated on output disk 39. Output disk 39 has a fourth maximum distance $b_4$, transmission element 38 has a fifth maximum distance $b_5$, and cover 15 has a sixth maximum distance $b_6$. In the exemplary embodiment, sixth maximum distance $b_6$ of cover 15 corresponds to third maximum distance $b_3$ of transmission mechanism 19, since third outer contour 47 of transmission mechanism 19 is determined by cover 15.

Figure 5A:
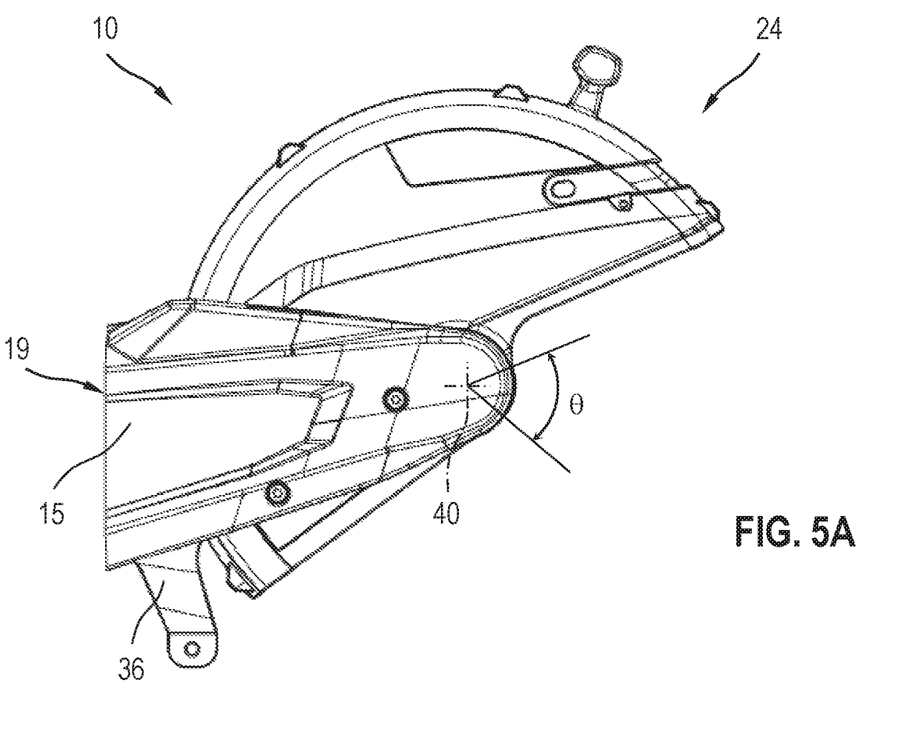
FIGS. 5A, 5B show the cutting-off machine in the front pivot position of the safety guard (FIG. 5A) and the rear pivot position of the safety guard (FIG. 5B).
Figure 5B:
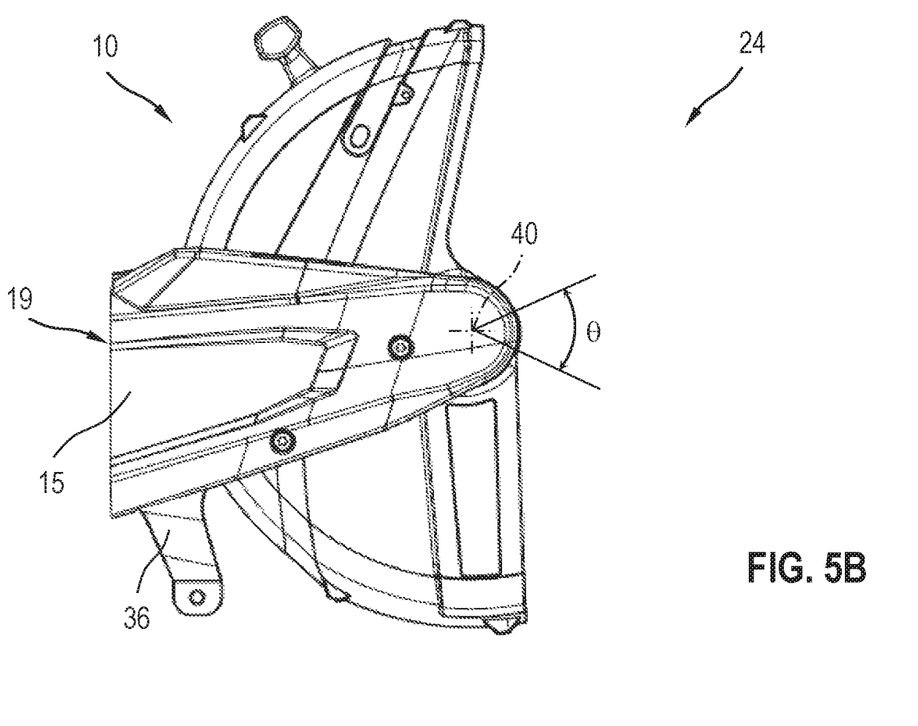

FIGS. 5A, 5B show cutting-off machine 10 according to the present invention, including safety guard 24, supporting housing part 36 and transmission mechanism 19 in the front pivot position of safety guard 24 (FIG. 5A) and in the rear pivot position of safety guard 24 (FIG. 5B).

Safety guard 24 does not project over flange 41 in first angle range $\theta_1$, supporting housing part 36 does not project over flange 41 in second angle range $\theta_2$, and transmission mechanism 19 does not project over flange 41 in third angle range $\theta_3$. The intersection between first angle range $\theta_1$, second angle range $\theta_2$ and third angle range $\theta_3$ is defined as outcut angle $\theta$. In outcut angle $\theta$, safety guard 24, supporting housing part 36 and transmission mechanism 19 have distances from output axis 40 which are less than or equal to half of minimum flange diameter $d_{min}$. When the operating angle of cutting-off machine 10 according to the present invention is within outcut angle $\theta$, maximum cutting depth $t_{max}$ is achievable, which is defined as half the difference between wheel diameter D of cutting-off wheel 11 and minimum flange diameter $d_{min}$.

Since safety guard 24 is pivotable around pivot axis 27, the position of first angle range $\theta_1$ changes relative to second angle range $\theta_2$ of supporting housing part 36 and third angle range $\theta_3$ of transmission mechanism 19. FIG. 5A shows outcut angle $\theta$ in the front pivot position of safety guard 24, and FIG. 5B shows outcut angle $\theta$ in the rear pivot position of safety guard 24. In the exemplary embodiment, outcut angle $\theta$ is approximately 62° in the front pivot position and approximately 55° in the rear pivot position. Outcut angle $\theta$ is different than zero in all pivot positions of safety guard 24 between the front and rear pivot positions. Since outcut angle $\theta$ is different than zero for all pivot positions of safety guard 24, maximum cutting depth $t_{max}$ is achievable in each pivot position of safety guard 24. Cutting-off machine 10 must only be oriented by the operator in such a way that the operating angle is within outcut angle $\theta$.

What is claimed is:

1. A handheld, hand-guided cutting-off machine comprising:
   a supporting housing part;
   a cutting-off wheel having a wheel diameter;
   an output shaft rotatably supported around an output axis on the housing part with the aid of a bearing element;
   a drive motor and a transmission mechanism connecting the drive motor to the output shaft, the transmission mechanism being situated on the housing part;
   a flange having a flange diameter, the cutting-off wheel being rotatably fixedly situatable on the output shaft with the aid of the flange; and a safety guard having a covering area at least partially covering the cutting-off wheel, and a machining area exposing the cutting-off wheel, the safety guard being pivotably supported around a pivot axis on the housing part;

the flange diameter of the flange corresponding to a minimum flange diameter, and the safety guard having a first maximum distance from the output axis over a first angle range, the supporting housing part having a second maximum distance from the output axis over a second angle range, and the transmission mechanism has a third maximum distance from the output axis over a third angle range, wherein the first, second and third maximum distances are less than or equal to half the minimum flange diameter.

2. The cutting-off machine as recited in claim 1 wherein the safety guard is adjustable between a front and a rear pivot position, an outcut angle formed as an intersection between the first, second and third angle ranges, being different than zero for at least one pivot position of the safety guard.

3. The cutting-off machine as recited in claim 2 wherein the outcut angle is different than zero for all pivot positions of the safety guard between the front and the rear pivot positions.

4. The cutting-off machine as recited in claim 1 wherein the pivot axis of the safety guard is displaced with respect to the output axis of the output shaft by a distance into the covering area of the safety guard.

5. The cutting-off machine as recited in claim 4 wherein a size of the first angle range is dependent on a pivot position of the safety guard.

6. The cutting-off machine as recited in claim 1 wherein the transmission mechanism includes an output disk situated on the output shaft, and a transmission element transmitting a movement of the drive motor to the output disk, the output disk having a fourth maximum distance and the transmission element having a fifth maximum distance from the output axis over the third angle range, wherein the fourth and fifth maximum distances are less than or equal to half the minimum flange diameter.

7. The cutting-off machine as recited in claim 6 wherein the transmission mechanism includes a cover covering the output disk and the transmission element, the cover having a sixth maximum distance from the output axis over the third angle range, the sixth maximum distance being less than or equal to half the minimum flange diameter.

8. The cutting-off machine as recited in claim 7 wherein the drive motor is a combustion motor, and the cutting-off wheel is designed as a diamond cutting-off wheel or as an abrasive cutting-off wheel.

9. The cutting-off machine as recited in claim 1 wherein the drive motor is an electric motor, and the cutting-off wheel is designed as a diamond cutting-off wheel or as a bound, reinforced cutting-off wheel.

* * * * *